US007118818B2

United States Patent
Agnew et al.

(10) Patent No.: US 7,118,818 B2
(45) Date of Patent: Oct. 10, 2006

(54) SOLID OXIDE FUEL CELL SYSTEM

(75) Inventors: Gerard D Agnew, Derby (GB); Robert R Moritz, Indianapolis, IN (US); Olivier C Tarnowski, Derby (GB); Michele Bozzolo, Derby (GB)

(73) Assignee: Rolls-Royce plc, London (GB)

( * ) Notice: Subject to any disclaimer, the term of this patent is extended or adjusted under 35 U.S.C. 154(b) by 376 days.

(21) Appl. No.: 10/260,271

(22) Filed: Oct. 1, 2002

(65) Prior Publication Data

US 2004/0062973 A1    Apr. 1, 2004

(51) Int. Cl.
*H01M 8/04* (2006.01)
*H01M 8/00* (2006.01)

(52) U.S. Cl. ............................. 429/17; 429/12; 429/26
(58) Field of Classification Search ............... 429/12, 429/34, 32, 17, 26
See application file for complete search history.

(56) References Cited

U.S. PATENT DOCUMENTS

| | | | | |
|---|---|---|---|---|
| 4,622,275 A | * | 11/1986 | Noguchi et al. | 429/19 |
| 5,071,719 A | * | 12/1991 | Rostrup-Nielsen et al. | 429/19 |
| 5,169,730 A | * | 12/1992 | Reichner et al. | 429/20 |
| 5,413,879 A | * | 5/1995 | Domeracki et al. | 429/30 |
| 5,573,867 A | * | 11/1996 | Zafred et al. | 429/17 |

* cited by examiner

*Primary Examiner*—Patrick Joseph Ryan
*Assistant Examiner*—Thomas H. Parsons
(74) *Attorney, Agent, or Firm*—W. Warren Taltavull; Manelli Denison & Selter PLLC (57) ABSTRACT

A system comprising a solid oxide fuel cell stack and a gas turbine engine. The stack comprises a plurality of solid oxide fuel cells, each fuel cell comprises an electrolyte, an anode and a cathode. The gas turbine engine comprises a compressor and a turbine with the compressor supplying oxidant to the cathodes. There are means to supply fuel to the anodes and to supply a portion of the unused oxidant from the solid oxide fuel cells to the cathodes. The means to supply a portion of the unused oxidant comprises a combustor and an ejector with the combustor burning a portion of the unused fuel from the solid oxide fuel cells in the portion of the unused oxidant from the fuel cells and is arranged to supply products of the combustor to the oxidant supplied by the compressor to the cathodes to preheat the oxidant supplied by the compressor.

26 Claims, 4 Drawing Sheets

SOLID OXIDE FUEL CELL SYSTEM

FIELD OF THE INVENTION

The present invention relates to a high temperature fuel cell system, in particular a solid oxide fuel cell system.

BACKGROUND OF THE INVENTION

One known solid oxide fuel cell system, as disclosed in our published European patent application EP0668622A1, comprises a solid oxide fuel cell stack and a gas turbine engine. The solid oxide fuel cell stack comprises a plurality of solid oxide fuel cells and each solid oxide fuel cell comprises an electrolyte, an anode and a cathode. The gas turbine engine comprises a compressor and a turbine arranged to drive the compressor. The compressor is arranged to supply oxidant to the cathodes of the solid oxide fuel cells and there are means to supply fuel to the anodes of the solid oxide fuel cells. A portion of the unused oxidant is supplied from the solid oxide fuel cells to the cathodes. A portion of the unused fuel is burnt in the remainder of the unused oxidant in a combustor and the products of the combustor drive the turbine. A heat exchanger may be provided to transfer heat from the products of the combustor to the oxidant supplied from the compressor to the at least one cathode to preheat the oxidant supplied by the compressor.

In this arrangement the combustor is arranged upstream of the high temperature heat exchanger.

A problem with this arrangement is that it is necessary to use a high temperature heat exchanger to transfer heat from the products of the combustor to the oxidant supplied from the compressor to the solid oxide fuel cells in order for the oxidant to reach the required temperature before entering the solid oxide fuel cell stack.

SUMMARY OF THE INVENTION

Accordingly the present invention seeks to provide a novel solid oxide fuel cell system, which reduces, preferably overcomes, the above-mentioned problems.

Accordingly the present invention provides a solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply at least a portion of the unused oxidant from the at least one solid oxide fuel cell to the cathode of the at least one solid oxide fuel cell, the means to supply at least a portion of the unused oxidant comprising a combustor, the combustor being arranged to burn at least a portion of the unused fuel from the at least one solid oxide fuel cell in the at least a portion of the unused oxidant from the at least one solid oxide fuel cell and being arranged to supply the products of the combustor to the oxidant supplied by the compressor to the cathode of the least one solid oxide fuel cell to preheat the oxidant supplied by the compressor.

Preferably the solid oxide fuel cell stack comprises a plurality of solid oxide fuel cells.

Preferably a second portion of the unused oxidant is supplied to the turbine to drive the turbine.

A heat exchanger may be provided to transfer heat from the turbine exhaust gases to the oxidant supplied from the compressor to the cathode of the at least one solid oxide fuel cell to preheat the oxidant supplied by the compressor.

Alternatively the combustor is arranged to burn at least a portion of the unused fuel from the at least one solid oxide fuel cell in all of the unused oxidant from the at least one solid oxide fuel cell.

The combustor may be arranged to supply a portion of the products of the combustor to the oxidant supplied by the compressor to the cathode of the least one solid oxide fuel cell to preheat the oxidant supplied by the compressor.

A second portion of the products of the combustor may be supplied to the turbine to drive the turbine.

A heat exchanger may be provided to transfer heat from the products of the combustor to the oxidant supplied from the compressor to the cathode of the at least one solid oxide fuel cell to preheat the oxidant supplied by the compressor.

Additionally there may be means to supply at least a second portion of the unused fuel from the at least one solid oxide fuel cell to the anode, the means to supply a second portion of the unused fuel being arranged to supply the second portion of the unused fuel to the fuel supplied by the means to supply fuel to preheat the fuel supplied by the means to supply fuel.

Preferably the means to supply at least a second portion of the unused fuel comprises means to pressurise the unused fuel and means to mix the unused fuel with the fuel.

Preferably the means to pressurise the unused fuel and means to mix the unused fuel with the fuel comprises an ejector.

Alternatively the means to pressurise the unused fuel and means to mix the unused fuel with the fuel comprises a pump, a fan, a blower or a turbomachine and a mixer.

Preferably the means to supply at least a portion of the unused oxidant comprises means to pressurise the unused oxidant and means to mix the unused oxidant with the oxidant.

Preferably the means to pressurise the unused oxidant and means to mix the unused oxidant with the oxidant comprises an ejector.

Alternatively the means to pressurise the unused fuel comprises a pump, a fan, a blower or a turbomachine and the means to mix the unused fuel with the fuel comprises a mixer.

Preferably the combustor is arranged to supply the products of the combustor to the oxidant supplied by the compressor to the cathode of the at least one solid oxide fuel cell to preheat the oxidant supplied by the compressor via the means to pressurise the unused oxidant and means to mix the unused oxidant with the oxidant.

Preferably the ejector is a jet pump

Preferably the means to supply fuel to the anode of the at least one solid oxide fuel cell comprises a reformer, the reformer is arranged to reform the fuel, a fuel supply is arranged to supply fuel to the reformer and the reformer is arranged to supply reformed fuel to the anode of the at least one solid oxide fuel cell.

Preferably the means to supply at least a portion of the unused oxidant is arranged to heat the reformer.

BRIEF DESCRIPTION OF THE DRAWINGS

The present invention will be more fully described by way of example with reference to the accompanying drawings in which.

DETAILED DESCRIPTION OF THE INVENTION

Figure 1:
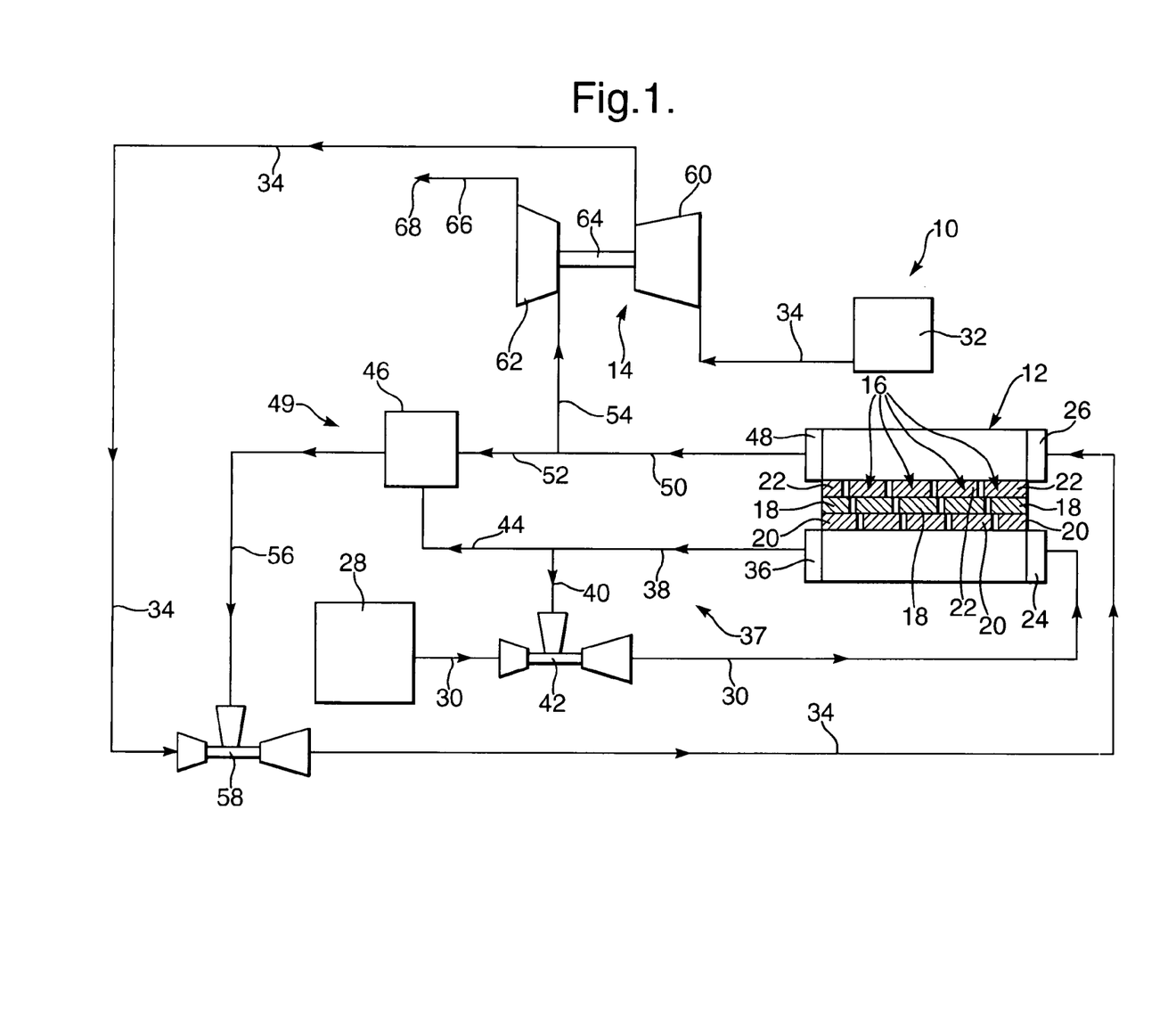
FIG. 1 shows a solid oxide fuel cell system according to the present invention.

A solid oxide fuel cell system 10 according to the present invention is shown in FIG. 1 and the solid oxide fuel cell system comprises a solid oxide fuel cell stack 12 and a gas turbine engine 14. The solid oxide fuel cell stack 12 comprises a plurality of solid oxide fuel cells 16 and each solid oxide fuel cell 16 comprises an electrolyte 18, an anode 20 and a cathode 22. The anode 20 and cathode 22 are on oppositely directed surfaces of the electrolyte 18.

The gas turbine engine 14 comprises a compressor 60 and a turbine 62, and the turbine 62 is arranged to drive the compressor 60 via a shaft 64.

The anodes 20 are supplied with a fuel, for example hydrogen, by a fuel manifold 24 and a fuel supply 28, for example hydrogen, is arranged to supply fuel to the fuel manifold 24 via a duct 30. The cathodes 22 are supplied with an oxidant, for example oxygen, air etc, by an oxidant manifold 26 and an oxidant supply 32 is arranged to supply oxidant to the oxidant manifold 26 via a duct 34.

The anodes 20 are provided with an unused fuel collection manifold 36 into which unused fuel is discharged. The unused fuel collection manifold 36 is connected to the duct 30 via ducts 38 and 40 such that a portion of the unused fuel is supplied, recirculated, to the fuel manifold 24. A fuel ejector 42 is provided to induce the supply, recirculation, of unused fuel from the unused fuel collection manifold 36 to the fuel manifold 24. The ducts 38, 40 and fuel ejector 42 form moans 37 to supply, recirculate, unused fuel from the anodes 20 of the solid oxide fuel cells 16 back to the anodes 20 of the solid oxide fuel cells 16. The fuel ejector 42 pressurises the unused fuel and mixes the unused fuel with the fuel supplied by the fuel supply 28 through the duct 30 to the fuel manifold 24.

The unused fuel collection manifold 36 is also connected to a combustor 46 via the duct 38 and a further duct 44 such that a second portion of the unused fuel is supplied to the combustor 46.

The cathodes 22 are provided with an unused oxidant collection manifold 48 into which unused oxidant is discharged. The unused oxidant collection manifold 48 is connected to the duct 34 via ducts 50 and 52, the combustor 46 and a duct 56 such that a portion of the unused oxidant is supplied, recirculated, to the oxidant manifold 76. An oxidant ejector 58 is provided to induce the supply, recirculation, of unused oxidant from the unused oxidant collection manifold 48 to the oxidant manifold 26. The ducts 50, 52 and 56 and oxidant ejector 58 form means 49 to supply, recirculate, unused oxidant from the cathodes 22 of the solid oxide fuel cells 16 back to the cathodes 22 of the solid oxide fuel cells 16.

The second portion of unused fuel supplied to the combustor 46 is burnt in the portion of unused oxidant supplied to the combustor 46 to produce hot gases. The hot gases produced in the combustor 46 are arranged to flow with unused oxidant through the duct 56 and the oxidant ejector 58 to the duct 34 and thence to the oxidant manifold 26. The products, the hot gases and unused oxidant, of the combustor 46 are supplied by the combustor 46 and duct 56 to the oxidant ejector 58. The oxidant ejector 58 pressurises the products of the combustor 46 and mixes the products of the combustor 46 with the oxidant supplied by the compressor 60 through the duct 34 to the oxidant manifold 26 to preheat the oxidant supplied by the compressor 60.

The unused oxidant collection manifold 48 is also connected to the turbine 62 via the duct 50 and a further duct 54 such that a second portion of the unused oxidant is supplied to the turbine 62. The second portion of unused oxidant drives the turbine 62. The second portion of unused oxidant then flows through a duct 66 and is discharged though an exhaust 68.

The ducts may be simple pipes or other arrangements to transfer the fuel, oxidant etc from one component to another component of the solid oxide fuel cell system.

In the prior art a combustor indirectly heats up the unused oxidant supplied from the unused oxidant collection manifold to the oxidant manifold through a high temperature heat exchanger.

The advantage of this arrangement is that the combustor directly heats up the unused oxidant supplied from the unused oxidant collection manifold to the oxidant manifold and therefore there is no need for a high temperature heat exchanger. This enables a simplification of the solid oxide fuel cell system, minimises the number of components, reduces costs and improves maintainability. It is believed that the solid oxide fuel cell system has a better load following capability, because there is no heat exchanger and the oxidant ejector has a better capability to cope with varying parameters. Furthermore, this arrangement allows the use of a simple, low technology, gas turbine. Additionally, the burning of unused fuel in the combustor produces hot gases, for example carbon monoxide and water, steam, which are supplied to the cathodes. In the event of a leak from the solid oxide fuel cell stack there is a reduction in the flame temperature, which reduces damage to the solid oxide fuel cell stack.

Figure 2:
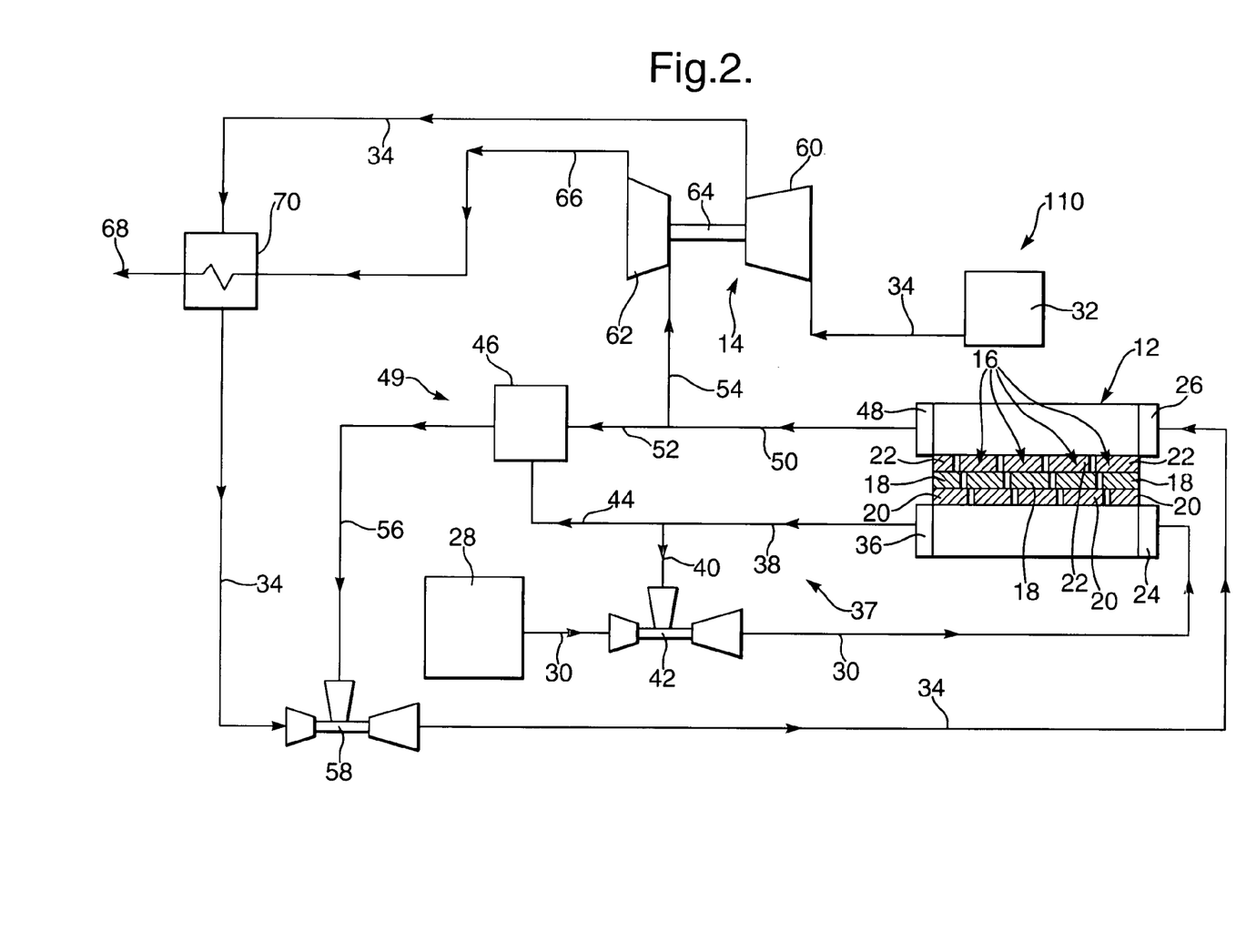
FIG. 2 shows an alternative solid oxide fuel cell system according to the present invention.

An alternative solid oxide fuel cell system 110 according to the present invention is shown in FIG. 2 and the solid oxide fuel cell system 110 comprises a solid oxide fuel cell stack 12 and a gas turbine engine 14. The solid oxide fuel cell system 110 is substantially the same as the solid oxide fuel cell system 10 shown in FIG. 1, and like parts are denoted by like numerals.

The solid oxide fuel call system 110 differs to the solid oxide fuel cell system 10 in that the solid oxide fuel cell system 110 comprises a heat exchanger 70. The heat exchanger 70 is a low effectiveness heat exchanger 70 and may be formed from metal or ceramic. The heat exchanger 70 is provided to transfer heat from the unused oxidant to the oxidant supplied from the compressor 60 to the cathodes 22 of the solid oxide fuel cells 16 to preheat the oxidant supplied by the compressor 60. The heat exchanger 70 is arranged to preheat the flow of oxidant from the compressor 60 to the oxidant manifold 26 in the duct 34 between the compressor 60 and the oxidant ejector 58. The heat exchanger 70 is arranged to extract heat from the flow of unused oxidant in the duct 66 between the turbine 62 and the exhaust 68.

The advantage of this arrangement is that the combustor directly heats up the unused oxidant supplied from the unused oxidant collection manifold to the oxidant manifold and therefore there is no need for a high temperature heat exchanger. This enables a simplification of the solid oxide fuel cell system, minimises the number of components, reduces costs and improves maintainability.

The further advantage of this arrangement is that more efficient, larger size, turbomachinery, turbine and compressor, may be used because the heat exchanger has low effectiveness and has a low inlet temperature, because the heat exchanger is positioned downstream of the turbine.

Figure 3:
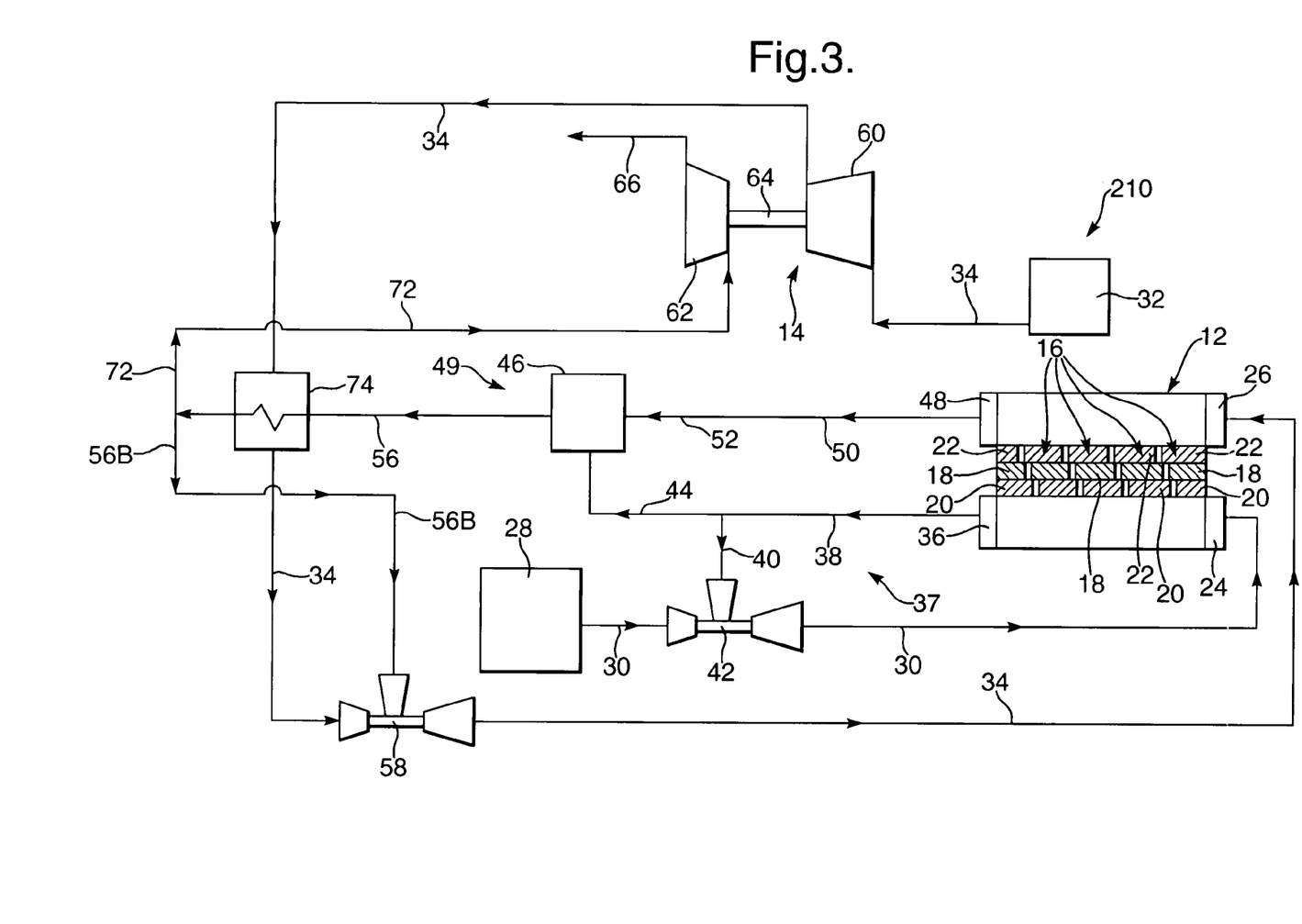
FIG. 3 shows a further solid oxide fuel cell system according to the present invention.

A further solid oxide fuel cell system 210 according to the present invention is shown in FIG. 3 and the solid oxide fuel cell system 210 comprises a solid oxide fuel cell stack 12 and a gas turbine engine 14. The solid oxide fuel cell system 210 is substantially the same as the solid oxide fuel cell system 10 shown in FIG. 1, and like parts are denoted by like numerals.

The solid oxide fuel cell system 210 differs to the solid oxide fuel cell system 10 in that the solid oxide fuel cell system 210 supplies all the unused oxidant from the oxidant collection manifold 48 through duct 50 to the combustor 46. A second portion of the unused fuel is burnt in all the unused oxidant in the combustor 46 to produce hot gases. A first portion of the products, the hot gases and unused oxidant, of the combustor 46 are supplied though the ducts 56 and 56B to the oxidant ejector 58. A second portion of the products, the hot gases and unused oxidant, of the combustor 46 is supplied through the ducts 56 and 72 to the turbine 62 to drive the turbine 62.

A heat exchanger 74 is provided to transfer heat from the products, hot gases and unused oxidant, of the combustor 46 to the oxidant supplied from the compressor 60 to the cathodes 22 of the solid oxide fuel cells 16 to preheat the oxidant supplied by the compressor 60. The heat exchanger 74 is a low effectiveness heat exchanger 74 and may be formed from metal or ceramic. The heat exchanger 74 is arranged to preheat the flow of oxidant from the compressor 60 to the oxidant manifold 26 in the duct 34 between the oxidant ejector 58 and the oxidant manifold 26. The heat exchanger 74 is arranged to extract heat from the flow of the products, hot gases and unused oxidant, of the combustor 46 in the duct 56 between the combustor 46 and the turbine 62 or oxidant ejector 58.

The advantage of this arrangement is that the combustor directly heats up the unused oxidant supplied from the unused oxidant collection manifold to the oxidant manifold and therefore there is reduced need for a heat exchanger. This enables a simplification of the solid oxide fuel cell system, reduces costs and improves reliability.

The gas turbine engine may have variable guide vanes in the compressor and/or the turbine for example variable inlet guide vanes.

The oxidant ejector may be a jet pump. Alternatively other means may be provided to pressurise and mix the products of the combustor with the oxidant supplied by the compressor. For example a turbomachine, a fan, a pump or blower may be provided to pressurise the products of the combustor and a separate mixer may be provided to mix the products of the combustor and the oxidant. The turbomachine may be driven by a free power turbine. The fan, pump or blower may be driven by a free power turbine, electrically or by other suitable means.

The fuel ejector may be a jet pump. Alternatively other means may be provided to pressurise and mix the unused fuel with the fuel supplied by the fuel supply. For example a turbomachine, a fan, a pump or blower may be provided to pressurize the unused fuel and a separate mixer may be provided to mix the unused fuel and the fuel. The turbomachine may be driven by a free power turbine. The fan, pump or blower may be driven by a free power turbine, electrically or by other suitable means.

Figure 4:
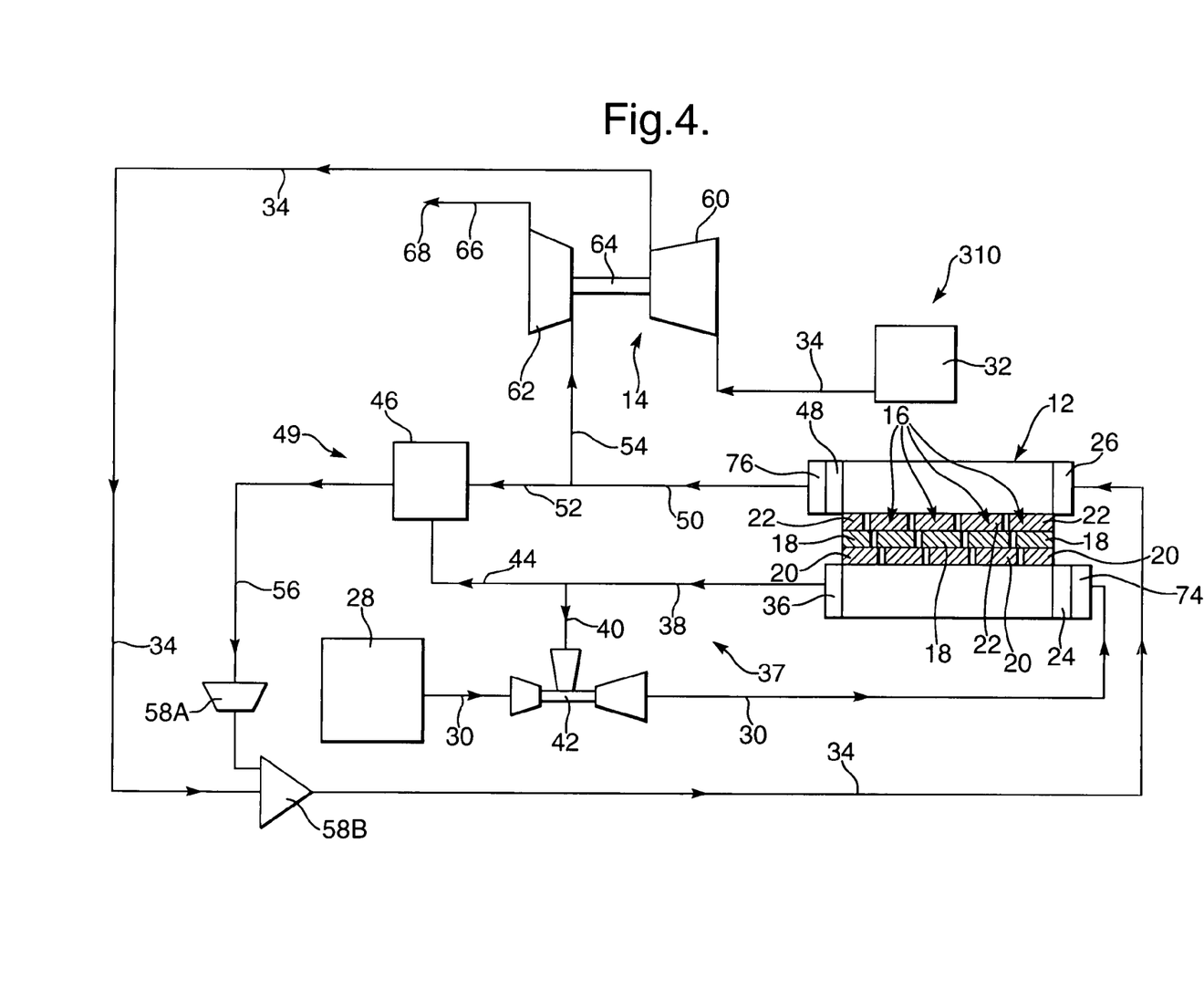
FIG. 4 shows another solid oxide fuel cell system according to the present invention.

A further solid oxide fuel cell system 310 according to the present invention is shown in FIG. 4 and the solid oxide fuel cell system 310 comprises a solid oxide fuel cell stack 12 and a gas turbine engine 14. The solid oxide fuel cell system 310 is substantially the same as the solid oxide fuel cell system 10 shown in FIG. 1, and like parts are denoted by like numerals. The solid oxide fuel cell system 310 differs to the solid oxide fuel cell system 10 in that in the solid oxide fuel cell system 310 the products, the hot gases and unused oxidant, of the combustor 46 are supplied by the combustor 46 and duct 56 firstly to an oxidant pump 58A, which pressurises the products of the combustor 46, and then secondly to a mixer 58B which mixes the products of the combustor 46 with the oxidant supplied by the compressor 60 through the duct 34 to the oxidant manifold 26, to preheat the oxidant supplied by the compressor 62.

The solid oxide fuel cell system 310 also differs to the solid oxide fuel cell system 10 in that in the solid oxide fuel cell system 310 the fuel supply 28 is a supply of a hydrocarbon fuel, for example methane. Also, the solid oxide fuel cell stack 12 has a reformer 74, which is arranged to reform the hydrocarbon fuel to hydrogen and carbon monoxide. The reformer 74 is positioned upstream of the fuel manifold 24 such that unreformed hydrocarbon fuel is supplied through duct 34 to the reformer 74 and reformed fuel, hydrogen and carbon monoxide, is supplied to the fuel manifold 24 The reforming reaction occurring in the reformer 74 is an endothermic reaction. The heat required for the endothermic reaction in the reformer 74 is provided by heat exchanger 76, which transfers heat from the unused oxidant immediately downstream of the unused oxidant collection manifold 48 to the reformer 74.

The pump 58A may be replaced by a fan, a blower or a turbomachine. The turbomachine may be driven by power turbine arranged to be driven by the exhaust gases flowing through the duct 66 from the turbine 62 to the exhaust 68.

For example in FIG. 4, for a 50 kWe solid oxide fuel cell system 310, the pressure of the oxidant at the outlet of the compressor 60 is 9.5 bar, 950 k Pascals, and the temperature is 390° C. The pressure of the oxidant at the oxidant manifold 26 is 7 bar, 700 k Pascals, and the temperature is 850° C. The temperature of the unused oxidant in the unused oxidant collection manifold 48 is 950° C. The pressure of the unused oxidant in the ducts 50, 52 and 54 is 7 bar, 700 k Pascals, and the temperature is 860° C. The pressure of the products of the combustor 46 in the duct 56 is 7 bar, 700 k Pascals, and the temperature is 1050° C. The pressure of the exhaust gases at the exhaust 68 is 1.013 bar, 101.3 k Pascals, and the temperature is 530° C.

It may be possible to use the reformer in FIG. 4 in the embodiments of FIGS. 1, 2 and 3, and/or the pump and mixer of FIG. 4 in FIGS. 1, 2 and 3.

As a further alternative in FIG. 4, it may be possible to have the duct 56 directly supply the mixer 58B and provide the pump 58A in the duct 34 between the mixer 58B and the oxidant manifold 26. This allows the use of a pump with a lower temperature capability.

Although the invention has been described with reference to a gas turbine engine comprising a single compressor and a single turbine, the gas turbine engine may comprise a low pressure compressor, a high pressure compressor, a high pressure turbine and a low pressure turbine. Alternatively the gas turbine engine may comprise a low pressure compressor, an intermediate pressure compressor, a high pressure compressor, a high pressure turbine, an intermediate pressure turbine and a low pressure turbine. The compressors may be axial flow compressors or radial flow compressors and similarly the turbines may be axial flow turbines or radial flow turbines.

The gas turbines may drive an electrical generator, e.g. an alternator to provide further electricity. The electrical generator may be driven by the low pressure compressor.

In the case of the gas turbine engines with a high pressure compressor there may be a bleed arrangement to bleed fluid from the downstream end of the high pressure compressor and to supply the bled fluid to the high pressure turbine. Alternatively, there may be a bleed arrangement to bleed fluid from the downstream end of the high pressure compressor and to discharge the bled fluid out of the gas turbine engine.

The invention claimed is:

1. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply at least a portion of the unused oxidant from the at least one solid oxide fuel cell to the cathode of the at least one solid oxide fuel cell, the means to supply at least a portion of the unused oxidant comprising a combustor, the combustor being arranged to burn at least a portion of the unused fuel from the at least one solid oxide fuel cell in the at least a portion of the unused oxidant from the at least one solid oxide fuel cell and being arranged to supply the products of the combustor to the oxidant supplied by the compressor to the cathode of the at least one solid oxide fuel cell to preheat the oxidant supplied by the compressor.

2. A solid oxide fuel cell system as claimed in claim 1 wherein the solid oxide fuel cell stack comprises a plurality of solid oxide fuel cells.

3. A solid oxide fuel cell system as claimed in claim 1 wherein a second portion of the unused oxidant is supplied to the turbine to drive the turbine.

4. A solid oxide fuel cell system as claimed in claim 1 wherein a heat exchanger is provided to transfer heat from the turbine exhaust gases to the oxidant supplied from the compressor to the cathode of the at least one solid oxide fuel cell to preheat the oxidant supplied by the compressor.

5. A solid oxide fuel cell system as claimed in claim 1 wherein the combustor is arranged to burn at least a portion of the unused fuel from the at least one solid oxide fuel cell in all of the unused oxidant from the at least one solid oxide fuel cell.

6. A solid oxide fuel cell system as claimed in claim 5 wherein the combustor is arranged to supply a portion of the products of the combustor to the oxidant supplied by the compressor to the cathode of the least one solid oxide fuel cell to preheat the oxidant supplied by the compressor.

7. A solid oxide fuel cell system as claimed in claim 6 wherein a second portion of the products of the combustor is supplied to the turbine to drive the turbine.

8. A solid oxide fuel cell system as claimed in claim 7 wherein a heat exchanger is provided to transfer heat from the products of the combustor to the oxidant supplied from the compressor to the cathode of the at least one solid oxide fuel cell to preheat the oxidant supplied by the compressor.

9. A solid oxide fuel cell system as claimed in claim 1 additionally comprising means to supply at least a second portion of the unused fuel from the at least one solid oxide fuel cell to the anode, the means to supply a second portion of the unused fuel being arranged to supply the second portion of the unused fuel to the fuel supplied by the means to supply fuel to preheat the fuel supplied by the means to supply fuel.

10. A solid oxide fuel cell system as claimed in claim 9 wherein the means to supply at least a second portion of the unused fuel comprises means to pressurise the unused fuel and means to mix the unused fuel with the fuel.

11. A solid oxide fuel cell system as claimed in claim 10 wherein the means to pressurise the unused fuel and means to mix the unused fuel with the fuel comprises an ejector.

12. A solid oxide fuel cell system as claimed in claim 10 wherein the means to pressurise the unused fuel comprises a pump, a fan, a blower or a turbomachine and the means to mix the unused fuel with the fuel comprises a mixer.

13. A solid oxide fuel cell system as claimed in claim 1 wherein the means to supply at least a portion of the unused oxidant comprises means to pressurise the unused oxidant and means to mix the unused oxidant with the oxidant.

14. A solid oxide fuel cell system as claimed in claim 13 wherein the means to pressurise the unused oxidant and means to mix the unused oxidant with the oxidant comprises an ejector.

15. A solid oxide fuel cell system as claimed in claim 13 wherein the means to pressurise the unused oxidant and means to mix the unused oxidant with the oxidant comprises a pump, a fan, a blower or a turbomachine and a mixer.

16. A solid oxide fuel cell system as claimed in claim 13 wherein the combustor is arranged to supply the products of the combustor to the oxidant supplied by the compressor to the cathode of the at least one solid oxide fuel cell to preheat the oxidant supplied by the compressor via the means to pressurise the unused oxidant and means to mix the unused oxidant with the oxidant.

17. A solid oxide fuel cell system as claimed in claim 11 wherein the ejector is a jet pump.

18. A solid oxide fuel cell system as claimed claim 1 wherein the means to supply fuel to the anode of the at least one solid oxide fuel cell comprises a reformer, the reformer is arranged to reform the fuel, a fuel supply is arranged to supply fuel to the reformer and the reformer is arranged to supply reformed fuel to the anode of the at least one solid oxide fuel cell.

19. A solid oxide fuel cell system as claimed in claim 18 wherein the means to supply at least a portion of the unused oxidant is arranged to heat the reformer.

20. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply at least a portion of the unused oxidant from the at least one solid oxide fuel cell to a combustor, means to supply at least a portion of the unused fuel from the at least one solid oxide fuel cell to the combustor, the combustor being arranged to burn the at least a portion of the unused fuel from the at least one solid oxide fuel cell in the at least a portion of the unused oxidant from the at least one solid oxide fuel cell and being arranged to supply the products of the combustor to the oxidant supplied by the compressor to the cathode of the at least one solid oxide fuel cell to preheat the oxidant supplied by the compressor.

21. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply a first portion of unused oxidant from the at least one solid oxide fuel cell to the cathode of the at least one solid oxide fuel cell, the means to supply the first portion of the unused oxidant from the at least one solid oxide fuel cell to the cathode of the at least one solid oxide fuel cell comprising a combustor, means to supply a first portion of unused fuel from the at least one solid oxide fuel cell to the combustor, the combustor being arranged to burn the first portion of unused fuel in the first portion of unused oxidant, the combustor being arranged to supply the products of the combustor to the oxidant supplied by the compressor to the cathode of the at least one solid oxide fuel cell to preheat the oxidant supplied by the compressor, means to supply a second portion of the unused oxidant to the turbine to drive the turbine, and means to supply a second portion of the unused fuel from the at least one solid oxide fuel cell to the anode of the at least one solid oxide fuel cell, the means to supply the second portion of unused fuel being arranged to supply the second portion of unused fuel to the fuel supplied by the means to supply fuel to preheat the fuel supplied by the means to supply fuel.

22. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply a first portion of unused oxidant from the at least one solid oxide fuel cell to the cathode of the at least one solid oxide fuel cell, the means to supply the first portion of the unused oxidant from the at least one solid oxide fuel cell to the cathode of the at least one solid oxide fuel cell comprising a combustor, means to supply a second portion of unused oxidant to the turbine to drive the turbine, means to supply the second portion of the unused oxidant from the at least one solid oxide fuel cell to the turbine comprising the combustor, means to supply a first portion of unused fuel from the at least one solid oxide fuel cell to the combustor, the combustor being arranged to burn the first portion of the unused fuel in the first portion and the second portion of the unused oxidant, the combustor being arranged to supply a first portion of the products of the combustor the oxidant supplied by the compressor to the cathode of the at least one solid oxide fuel cell to preheat the oxidant supplied by the compressor, the combustor being arranged to supply a second portion of the products of the combustor to the turbine to drive the turbine, and means to supply a second portion of the unused fuel from the at least one solid oxide fuel cell to the anode of the at least one solid oxide fuel cell, the means to supply the second portion of unused fuel being arranged to supply the second portion of unused fuel to the fuel supplied by the means to supply fuel to preheat the fuel supplied by the means to supply fuel.

23. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply at least a portion of the unused oxidant from the at least one solid oxide fuel cell to the cathode of the at least one solid oxide fuel cell, the means to supply at least a portion of the unused oxidant comprising a combustor, the combustor being arranged to burn at least a portion of the unused fuel from the at least one solid oxide fuel cell in the at least a portion of the unused oxidant from the at least one solid oxide fuel cell and being arranged to supply the products of the combustor to the oxidant supplied by the compressor to the cathode of the least one solid oxide fuel cell to preheat the oxidant supplied by the compressor such that the products of the combustor and the oxidant supplied by the compressor are combined.

24. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply at least a portion of the unused oxidant from the at least one solid oxide fuel cell to a combustor, means to supply at least a portion of the unused fuel from the at least one solid oxide fuel cell to the combustor, the combustor being arranged to burn the at least a portion of the unused fuel from the at least one solid oxide fuel cell in the at least a portion of the unused oxidant from the at least one solid oxide fuel cell and being arranged to supply the products of the combustor to the oxidant supplied by the compressor to the cathode of the at least one solid oxide fuel cell to preheat the oxidant supplied by the compressor such that the products of the combustor and the oxidant supplied by the compressor are combined.

25. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply a first portion of unused oxidant from the at least one solid oxide fuel cell to the cathode of the at least one solid oxide fuel cell, the means to supply the first portion of the unused oxidant from the at least one solid oxide fuel cell to the cathode of the at least one solid oxide fuel cell comprising a combustor, means to supply a first portion of unused fuel from the at least one solid oxide fuel cell to the combustor, the combustor being arranged to burn the first portion of unused fuel in the first portion of unused oxidant, the combustor being arranged to supply the products of the combustor to the oxidant supplied by the compressor to the cathode of the at least one solid oxide fuel cell to preheat the oxidant supplied by the compressor such that the products of the combustor and the oxidant supplied by the compressor are combined, means to supply a second portion of the unused oxidant to the turbine to drive the turbine, and means to supply a second portion of the unused fuel from the at least one solid oxide fuel cell to the anode of the at least one solid oxide fuel cell, the means to supply the second portion of unused fuel being arranged to supply the second portion of unused fuel to the fuel supplied by the means to supply fuel to preheat the fuel supplied by the means to supply fuel.

26. A solid oxide fuel cell system comprising a solid oxide fuel cell stack and a gas turbine engine, the solid oxide fuel cell stack comprising at least one solid oxide fuel cell, each solid oxide fuel cell comprising an electrolyte, an anode and a cathode, the gas turbine engine comprising a compressor and a turbine arranged to drive the compressor, the compressor being arranged to supply oxidant to the cathode of the at least one solid oxide fuel cell, means to supply fuel to the anode of the at least one solid oxide fuel cell, means to supply a first portion of unused oxidant from the at least one solid oxide fuel cell to the cathode of the at least one solid oxide fuel cell, the means to supply the first portion of the unused oxidant from the at least one solid oxide fuel cell to the cathode of the at least one solid oxide fuel cell comprising a combustor, means to supply a second portion of unused oxidant to the turbine to drive the turbine, means to supply the second portion of the unused oxidant from the at least one solid oxide fuel cell to the turbine comprising the combustor, means to supply a first portion of unused fuel from the at least one solid oxide fuel cell to the combustor, the combustor being arranged to burn the first portion of the unused fuel in the first portion and the second portion of the unused oxidant, the combustor being arranged to supply a first portion of the products of the combustor the oxidant supplied by the compressor to the cathode of the at least one solid oxide fuel cell to preheat the oxidant supplied by the compressor such that the products of the combustor and the oxidant supplied by the compressor are combined, the combustor being arranged to supply a second portion of the products of the combustor to the turbine to drive the turbine, and means to supply a second portion of the unused fuel from the at least one solid oxide fuel cell to the anode of the at least one solid oxide fuel cell, the means to supply the second portion of unused fuel being arranged to supply the second portion of unused fuel to the fuel supplied by the means to supply fuel to preheat the fuel supplied by the means to supply fuel.

* * * * *